United States Patent
He et al.

(10) Patent No.: US 10,459,806 B1
(45) Date of Patent: Oct. 29, 2019

(54) CLOUD STORAGE REPLICA OF A STORAGE ARRAY DEVICE

(71) Applicant: EMC IP HOLDING COMPANY LLC, Hopkinton, MA (US)

(72) Inventors: Xiali He, Upton, MA (US); John W. Bates, Mendon, MA (US); Slavik Neymer, Tel Aviv (IL); Arieh Don, Newton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 149 days.

(21) Appl. No.: 15/491,230

(22) Filed: Apr. 19, 2017

(51) Int. Cl.
| G06F 11/00 | (2006.01) |
| G06F 11/16 | (2006.01) |
| G06F 3/06 | (2006.01) |
| G06F 12/10 | (2016.01) |
| G06F 11/20 | (2006.01) |

(52) U.S. Cl.
CPC .......... *G06F 11/1662* (2013.01); *G06F 3/065* (2013.01); *G06F 3/067* (2013.01); *G06F 3/0619* (2013.01); *G06F 11/1666* (2013.01); *G06F 11/2023* (2013.01); *G06F 11/2046* (2013.01); *G06F 11/2097* (2013.01); *G06F 12/10* (2013.01); *G06F 2201/84* (2013.01); *G06F 2212/65* (2013.01)

(58) Field of Classification Search
CPC combination set(s) only.
See application file for complete search history.

(56) References Cited

U.S. PATENT DOCUMENTS

| 10,162,542 B1 * | 12/2018 | Salamon | G06F 3/065 |
| 2015/0347548 A1 * | 12/2015 | Mortensen | G06F 16/178 707/618 |
| 2016/0048408 A1 * | 2/2016 | Madhu | G06F 11/1458 718/1 |
| 2018/0260125 A1 * | 9/2018 | Botes | G06F 3/0617 |

* cited by examiner

*Primary Examiner* — Amine Riad
(74) *Attorney, Agent, or Firm* — Anderson Gorecki LLP

(57) ABSTRACT

A cloud storage replica of a production device is created and asynchronously updated. A snap, clone or portion of the replica is copied to a cloud gateway in a failover situation. Access to replica images may be obtained via other cloud gateways.

16 Claims, 6 Drawing Sheets

CLOUD STORAGE REPLICA OF A STORAGE ARRAY DEVICE

BACKGROUND

The subject matter of this disclosure is generally related to computer networks in which a data storage system maintains data for multiple host servers and concurrent users. Host servers run data processing applications that may be referred to as host applications. Host application data may be maintained on tangible data storage drives that are managed by storage arrays. The storage arrays may present logical storage devices to the host servers for storage of host application data. The host servers may access the host application data by sending IOs with reference to the logical storage devices. The storage arrays implement the IOs by accessing the tangible data storage drives based on a mapping between the logical storage devices and the tangible storage drives. The storage arrays may provide a variety of data storage services including data backup and replication.

SUMMARY

All examples, aspects and features mentioned in this document can be combined in any technically possible way.

In accordance with an aspect, an apparatus comprises: a storage array comprising: a plurality of interconnected computing nodes, each of the computing nodes comprising at least one processor and non-transitory memory; a plurality of groups of data storage drives, each group of data storage drives connected with one of the computing nodes; and a production device comprising contiguous logical block addresses that map to non-contiguous addresses of the data storage drives; and a cloud storage comprising a plurality of storage servers, each storage server associated with to at least one data storage drive, wherein performance capability of the storage array differs from performance capability of the cloud storage, and a replica of the production device maintained on one or more of the data storage drives associated with the storage servers by asynchronously implementing production device changes on the replica. In some implementations the apparatus comprises a cloud gateway with a processor, memory and instructions on non-transitory computer-readable memory that convert IOs between a first form used by the storage array and a second form used by the cloud storage. In some implementations a splitter in the storage array provides the cloud gateway with copies of IOs that cause changes to the production device, and the cloud gateway converts the copies of the IOs to the second form and provides converted IOs to the cloud storage. In some implementations the cloud storage uses the converted IOs to generate a snap. In some implementations the cloud storage uses the converted IOs to generate a clone. In some implementations the cloud storage uses the converted IOs to update the replica. In some implementations the cloud gateway reads at least a part of the replica in a failover situation. In some implementations the cloud gateway reads a snap of the replica in a failover situation. In some implementations a second cloud gateway accesses an image of the replica in the failover situation. In some implementations a second production device is created on a second storage array from the replica in a failover situation.

In accordance with an aspect a method comprises: creating a cloud replica of a production device that is maintained by a storage array, the cloud replica existing in cloud storage, wherein performance capability of the storage array differs from performance capability of the cloud storage; writing production device data to the replica; and asynchronously implementing production device changes on the replica. Some implementations comprise splitting the changes by creating copies of IOs. Some implementations comprise using the changes to generate a snap in the cloud storage. Some implementations comprise using the changes to generate a clone in the cloud storage. Some implementations comprise reading at least a part of the replica to a cloud gateway in a failover situation. Some implementations comprise reading a snap of the replica to a cloud gateway in a failover situation. Some implementations comprise reading a clone of the replica to a cloud gateway in a failover situation. Some implementations comprise a second cloud gateway accessing an image of the replica in the failover situation.

In accordance with an aspect an apparatus comprises: a data replication appliance comprising a processor, non-transitory memory and instructions stored thereon that: create a cloud replica of a production device that is maintained by a storage array, the cloud replica existing in cloud storage, wherein performance capability of the storage array differs from performance capability of the cloud storage; write production device data to the replica; and asynchronously implement production device changes on the replica.

Other aspects, features and implementations may become apparent in view of the detailed description and figures.

DETAILED DESCRIPTION

Figure 1:
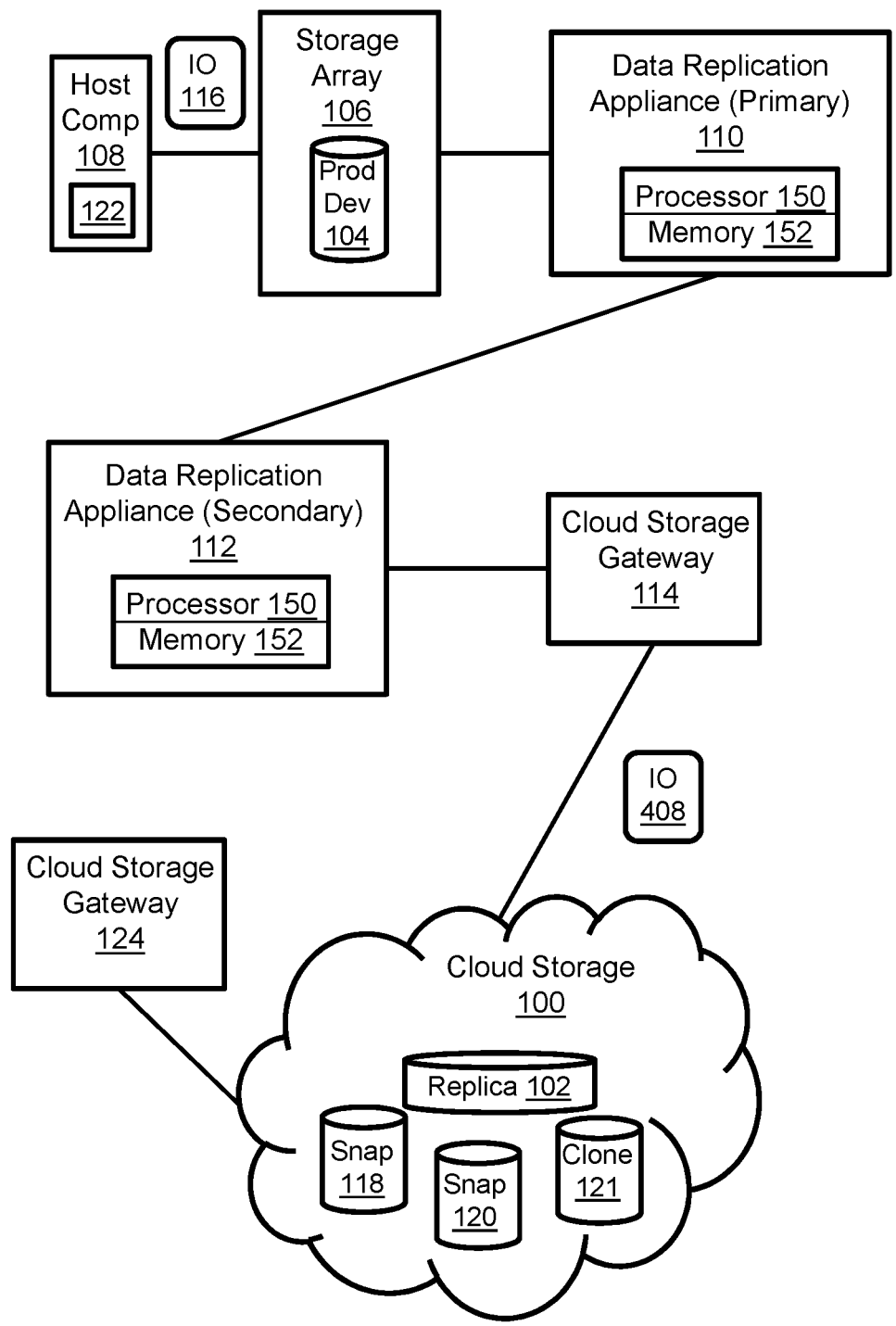
FIG. 1 illustrates a data storage system in which a cloud storage replica of a storage array device is maintained in cloud storage.

Specific examples may be presented in this detailed description in order to provide context and convey inventive concepts. The specific examples are not to be considered as limiting. Moreover, the features described herein may be combined in a wide variety of combinations.

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor hardware components. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features. For example, a virtual storage device could be based on multiple physical storage drives. The term "logic" is used to refer to special purpose physical circuit elements and software instructions that are stored on a non-transitory computer-readable medium and implemented by general-purpose tangible processors.

Data storage systems can provide a variety of services including but not limited to data backup and data replication. It is recognized by those of ordinary skill in the art that data backup and data replication are distinctly different services. Data backup helps to avoid data loss. Data replication helps to assure data availability. Data backup may be implemented by periodically copying data from a storage array to relatively low performance storage resources. For example, the storage array may use high performance SSDs (solid state devices) such as flash drives whereas a backup site for that storage array may use less costly low performance spinning disk media or tape drives. The backup site may be at a different geographical location from the production site in order to reduce the likelihood of destruction of both systems in the event of a disaster. Backups may be performed relatively infrequently in order to avoid degradation of the performance of the production site being backed up. For example and without limitation, backups may be performed daily or weekly. As a result, the backup copy is not synchronized with the production site data being backed up. Backups are useful for disaster recovery because the backup copy is likely to survive a disaster that destroys the production site. However, a disaster recovery operation from a backup copy interrupts host applications, may require considerable down time and is not transparent to the users. In contrast with data backup, data replication facilitates data availability by helping to provide failover capability. Data availability is sometimes quantified as the percentage of time that a host application is working and the host data is accessible. Data availability may be provided by maintaining a failover data storage system that has the same performance capabilities as a primary data storage system. For example, a production site storage array with a given TOPS (input-output operations per second) capability may be paired with an identical failover site storage array with the same TOPS capability. A replica of the data set on the production site storage array is maintained on the failover site storage array. Changes to the data set are implemented on both the production site storage array and the failover site storage array. For example, changes may be synchronously written to the production site storage array and backup site storage array. Synchronous writes enable the replica to be synchronized with the production site data set being replicated. In a failover situation the failover site storage array will quickly take over for the production site storage array by using the replica. The failover can potentially be transparent to the users, e.g. without interrupting host applications and without a noticeable loss of performance, because the recovery time provided by a failover site storage array with a replica is much faster than retrieval of backup data and disaster recovery procedures. However, maintaining redundant high performance storage arrays increases equipment and service costs.

FIG. 1 illustrates a data storage system in which cloud storage 100 is used to create and maintain a cloud storage replica 102 of a production device 104 maintained by a production site storage array 106. The production device 104 is a logical volume of storage that may be presented to a host computer 108. As will be explained in greater detail below, the cloud storage replica 102 may be used to provide a failover capability for the production device 104. The cloud storage replica 102 may be created by using cloud storage protocol commands to generate a representation of the production device 104 in cloud storage 100. For example and without limitation, the storage array 106 may signal to a primary data replication appliance 110, that signals to a secondary data replication appliance 112, that signals to a cloud storage gateway 114, that signals to the cloud storage 100 to prompt creation of the cloud storage replica 102. Additional replicas may optionally be maintained by other storage arrays. The functions of the primary data replication appliance 110, secondary data replication appliance 112, or both, may be integrated into the storage array, cloud storage gateway, another node, and combinations thereof.

The cloud storage replica 102 is synchronized with the production device 104. In response to an IO 116 from the host computer 108 to the storage array 106 the production device 104 may be changed. For example, the IO 116 may cause host application data to be written to the production device 104. The change is written to both the production device 104 and the cloud storage replica 102. For example, changes may be synchronously written or written asynchronously but on a frequent basis, e.g. and without limitation written to the cloud storage 100 within seconds or minutes of a write to the production site storage array 106. Asynchronous writes may facilitate operation of the host computer and production site storage array because the cloud storage 100 will typically exhibit lower performance than the storage array 106, e.g. in terms of TOPS that can be serviced.

The cloud storage 100 may generate snaps and clones associated with the cloud storage replica 102 in response to cloud storage protocol commands. The snaps may be incremental copies that only represent changes since some prior point in time, e.g. and without limitation since the previous snap. For example, a first snap 118 could be created at time t=0 and a second snap 120 could be created at time t=1, where snap 120 represents only the changes since snap 118 was created. Changes may be written to snaps rather than the replica. A clone 121 is a complete copy of the replica at some point in time. Clones may be created to provide prior point in time versions of the cloud storage replica 102 where the replica is updated with each change. A wide variety of different types of snaps and clones may be implemented.

The cloud storage replica 102 is not an ordinary replica because cloud storage 100 is not suitable for failover. More particularly, the performance of cloud storage, e.g. and without limitation in terms of TOPS, does not support the target demands of the host application 122 on the host computer 108. However the cloud storage replica 102 is not a backup copy because it is synchronized with the production device 104 and may be associated with snaps and clones. Further, unlike an ordinary replica the cloud storage replica is more reachable, e.g. via a second cloud storage gateway 124 that may be accessible to a variety of computing devices.

Figure 2:
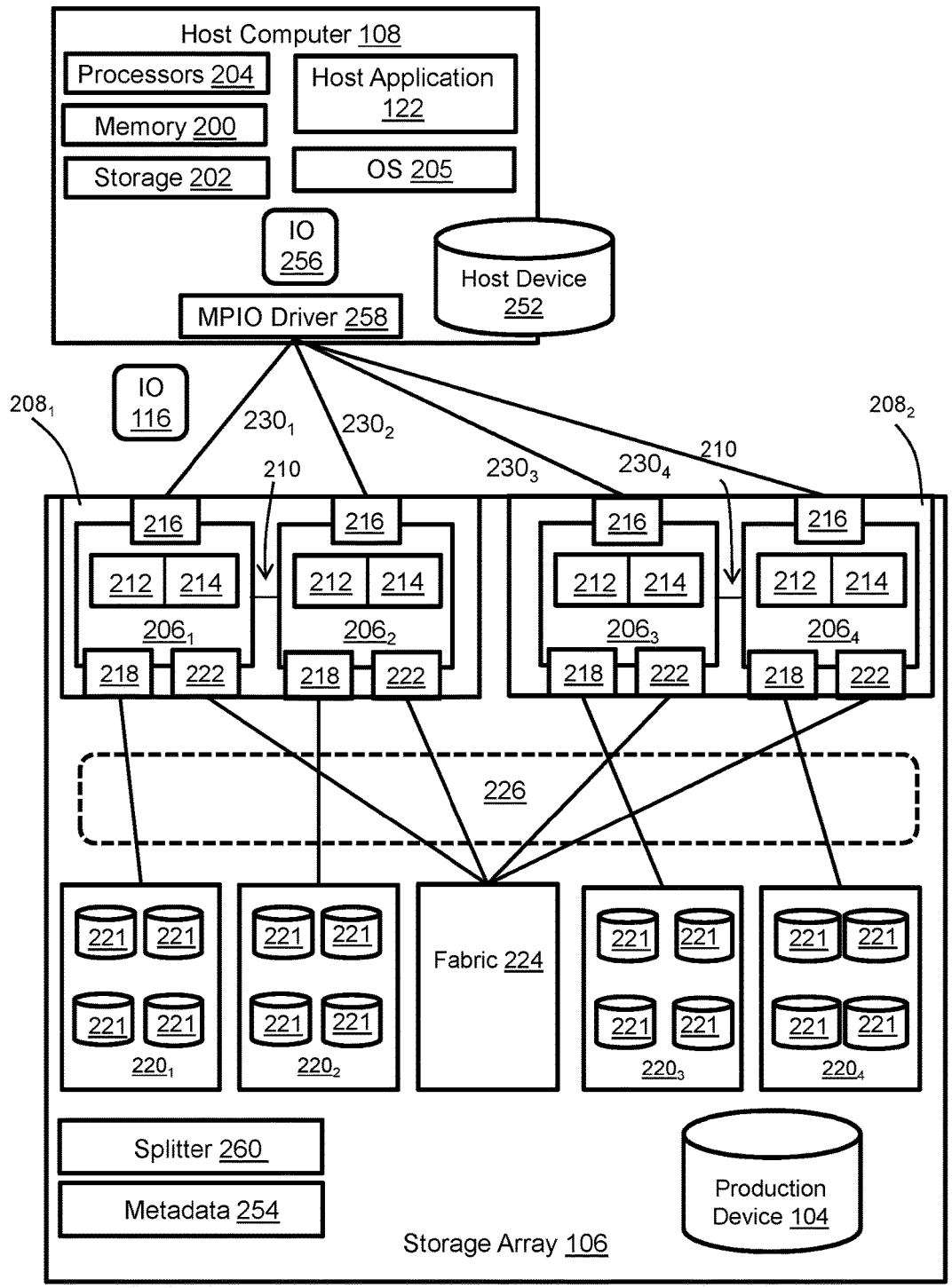
FIG. 2 illustrates the host computer and storage array of FIG. 1 in greater detail.

FIG. 2 illustrates the host computer 108 and storage array 106 of FIG. 1 in greater detail. The host computer 108 may be a "vanilla" server computer with volatile memory 200, persistent storage 202, one or more tangible processors 204, and an OS (operating system) 205. The host computer 108 might support virtual hosts running on virtual machines or containers, and although an external host computer is illustrated, internal hosts may be instantiated within the storage array.

The architecture and components of the storage array 106 are specially designed for providing data storage services. In the illustrated example the storage array 106 includes a plurality of computing nodes $206_1$-$206_4$ such as storage directors, for example and without limitation. Pairs of the computing nodes, e.g. ($206_1$, $206_2$) and ($206_3$, $206_4$), may be organized as storage engines $208_1$, $208_2$, respectively, for purposes of failover between computing nodes. The paired computing nodes of each storage engine may be directly interconnected by communication links 210. Each computing node includes at least one tangible multi-core processor 212 and a local cache 214. The local cache 214 may include, for example and without limitation, volatile memory components such as RAM (random access memory). Each computing node may include one or more FEs 216 (front-end directors, a.k.a. front end adapters) for communicating with the host computer 108. Each computing node $206_1$-$206_4$ may also include one or more BEs 218 (back end directors, a.k.a. back end adapters) for communicating with respective associated back end storage bays $220_1$-$220_4$, thereby enabling access to managed drives 221. The managed drives 221 may include tangible storage components of one or more technology types, for example and without limitation SSDs such as flash, and HDDs (hard disk drives) such as SATA (Serial Advanced Technology Attachment) and FC (Fibre Channel). Each computing node may also include one or more CAs (channel directors, a.k.a. channel adapters) 222 for communicating with other computing nodes via an interconnecting fabric 224. Each computing node may allocate a portion or partition of its respective local cache 214 to a virtual shared "global" cache 226 that can be accessed by other computing nodes, e.g. via DMA (direct memory access) or RDMA (remote direct memory access). The primary data replication appliance may be connected to one or more FEs and BEs in any combination.

The storage array 106 maintains data for the host application 122 running on host computer 108, and the host application uses storage services that are provided by the storage array. For example, the host application may write host application data to the storage array and read host application data from the storage array in order to perform various functions. Examples of host applications may include but are not limited to file servers, email servers, block servers and databases. The production device 104 and a host device 252 are created to enable the storage array to provide storage services to the host application. Without limitation, the production device 104 may be referred to as a production device, production volume, production LUN or host LUN, where LUN (Logical Unit Number) is a number used to identify the logical storage volume in accordance with the SCSI (Small Computer System Interface) protocol. The host device 252 is a representation of the production device 104. The host device 252 and the production device 104 represent abstraction layers between the managed drives 221 and the host application 122. From the perspective of the host application 122, the host device 252 is a single data storage device having a set of contiguous fixed-size LBAs (logical block addresses) on which data used by the host applications resides. However, the data used by the host applications may actually be maintained by the computing nodes $206_1$-$206_4$ at non-contiguous addresses on various different managed drives 221. Moreover, there may be multiple host computers with host devices that represent the production device.

In order to service IOs from the host application 122, the storage array 106 maintains metadata 254 that indicates, among various things, mappings between production device 104 storage space and the locations of extents of host application data on the managed drives 221. In response to an IO 256 from the host application to host device 252, an MPIO (Multi-Path Input-Output) driver 258 may determine whether the 10 can be serviced by accessing the host computer memory 200. If that is not possible then the MPIO driver generates IO 116 with reference to production device 104 and selects a path on which to send the IO 116 to the storage array 106. There are multiple paths $230_1$-$230_4$ between the host computer 102 and the storage array 106, e.g. one path per FE 216. Each path may have a locally unique address that is known to the MPIO driver 258. However, the host application is not aware of the paths and addresses because it views the host device 252 as being available via a single logical path. The paths may be selected by the MPIO driver based on a wide variety of techniques and algorithms including, for context and without limitation, performance and load balancing. In the case of a read IO 116 the storage array uses the metadata 254 to locate the requested data, e.g. in the shared cache 226 or managed drives 221. If the requested data is not in the shared cache then it is temporarily copied into the shared cache from the managed drives and sent to the host application via one of the computing nodes. In the case of a write IO 116 the storage array creates new metadata that maps the production device address with a location to which the data is written on the managed drives. The shared cache 226 may enable the production device to be reachable via all of the computing nodes and paths, although the storage array can be configured to limit use of certain paths to certain production devices.

Figure 3:
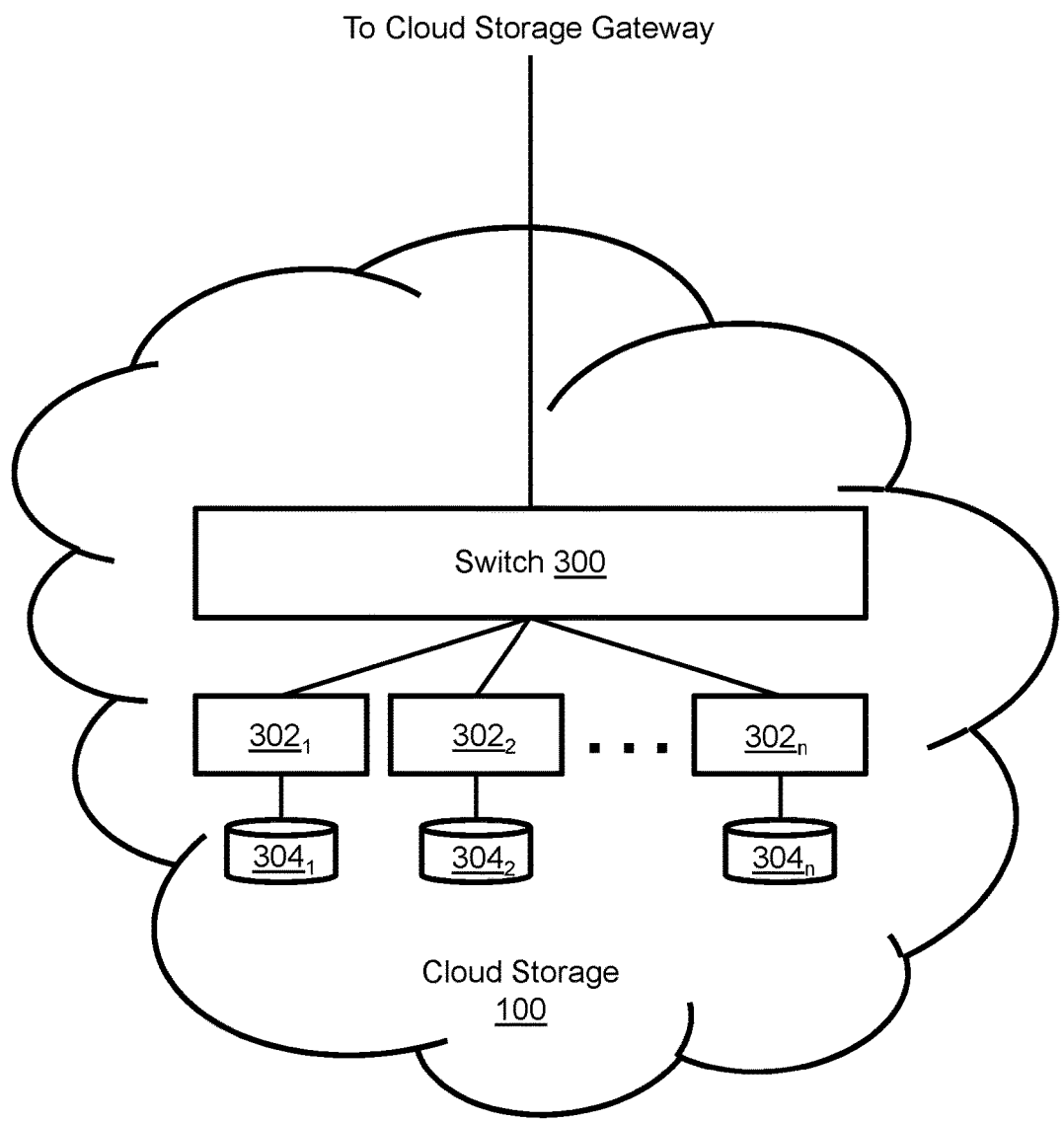
FIG. 3 illustrates the cloud storage of FIG. 1 in greater detail.

FIG. 3 illustrates the cloud storage 100 of FIG. 1 in greater detail. Cloud storage includes one or more switches and routers (collectively switch 300) that may be arranged in stages to provide access to clusters of storage servers $302_1$-$302_n$. The storage servers may be "vanilla" server computers with processors and memory. Each storage server manages associated storage media $304_1$-$304_n$, e.g. and without limitation spinning disk media. The switch 300 directs IOs to the appropriate storage server and data is maintained by the storage servers on the storage media. Cloud storage is known for use in situations where high performance capabilities are not required, e.g. data backup and storage of inactive or infrequently accessed data. Cloud storage providers maintain data centers with pools of physical storage devices that are accessible to enterprises via a private or public network, e.g., the internet. Cloud storage providers typically charge based on the amount of storage used, and take responsibility for maintaining additional free data storage resources, preventing data loss and maintaining data availability.

Figure 4:
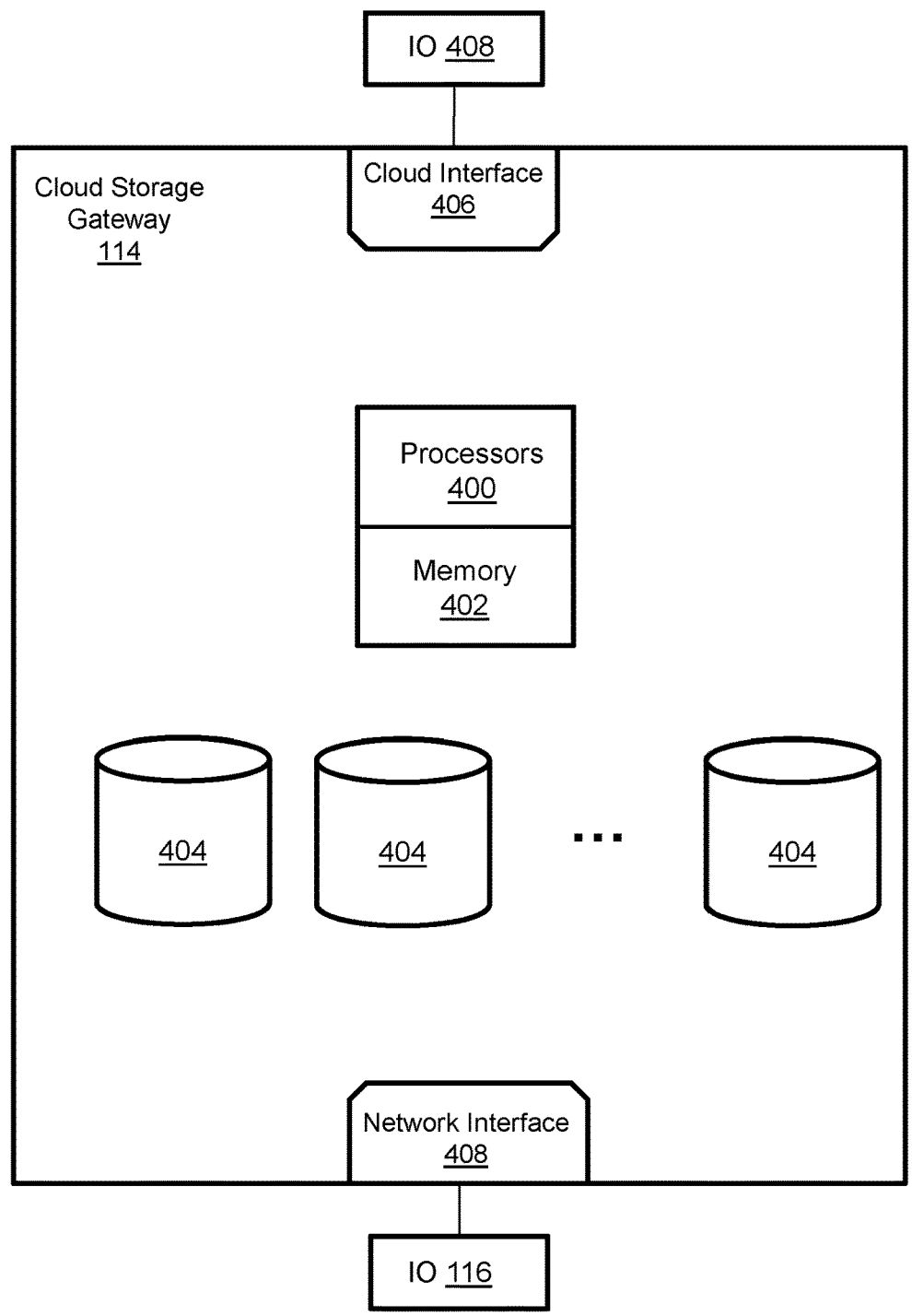
FIG. 4 illustrates the cloud gateway of FIG. 1 in greater detail.

FIG. 4 illustrates the cloud storage gateway 114 of FIG. 1 in greater detail. The cloud storage gateway includes tangible processors 400, memory 402, storage devices 404, a cloud interface 406 and a network interface 408. The cloud interface 406 is connected to cloud storage. The network interface 408 is connected to the secondary data replication appliance. The cloud storage gateway enables the storage array to use the data storage resources of cloud storage by functioning as an intermediary device. More particularly, the cloud storage gateway converts IOs between a form used by the storage array and a form used by cloud storage. Cloud storage providers and storage arrays are typically configured to utilize different protocols for IO requests. For example and without limitation, storage arrays may utilize a transport layer protocol such as Fibre Channel, iSCSI (internet small computer system interface) or NAS (Network-Attached Storage) protocols such as NFS (Network File System), SMB (Server Message Block), CIFS (Common Internet File System) and AFP (Apple Filing Protocol). In contrast, for example and without limitation, cloud storage may utilize a variety of different non-standard and provider-specific APIs (Application Programming Interfaces) such as AWS (Amazon Web Services), Dropbox, OpenStack, Google Drive/Storage APIs based on, e.g., JSON (JavaScript Object Notation). In response to receipt of an iSCSI format IO 116 from the storage array via the secondary data replication appliance, the cloud storage gateway may convert that IO into a format, for example and without limitation OpenStack, that can be processed by cloud storage, thereby providing corresponding OpenStack IO 408. The cloud storage gateway can also convert from the cloud storage format to the host/storage array format.

Referring now to FIGS. 1 through 4, data replication appliance instructions in memory 152 and implemented by processors 150 prompt initialization of the cloud storage replica 102 by creating the replica as a device corresponding to production device 104. The initialization instructions may also prompt writing of production device data to the cloud storage replica. Maintenance instructions asynchronously implement production device changes to the cloud storage replica, and/or snaps and clones thereof. When host application 122 running on host computer 108 generates IO 256 to access host device 252, the corresponding IO 116 is sent by MPIO driver 258 to the storage array 106. The storage array implements the changes corresponding to IO 106 on production device 104 by writing to the managed drives. Splitter 260 in the storage array prompts creation of a copy of IO 106 that is sent to the cloud gateway 114 via the primary and secondary data replication appliances. The cloud storage gateway converts IO 116 into cloud storage format, thereby creating IO 408. IO 408 is sent from the cloud storage gateway to cloud storage. The changes corresponding to IO 408 are made to the replica and/or snaps and clones thereof by cloud storage. For example and without limitation, cloud storage replica 102 may be updated and/or snaps and clones may be created.

Figure 5:
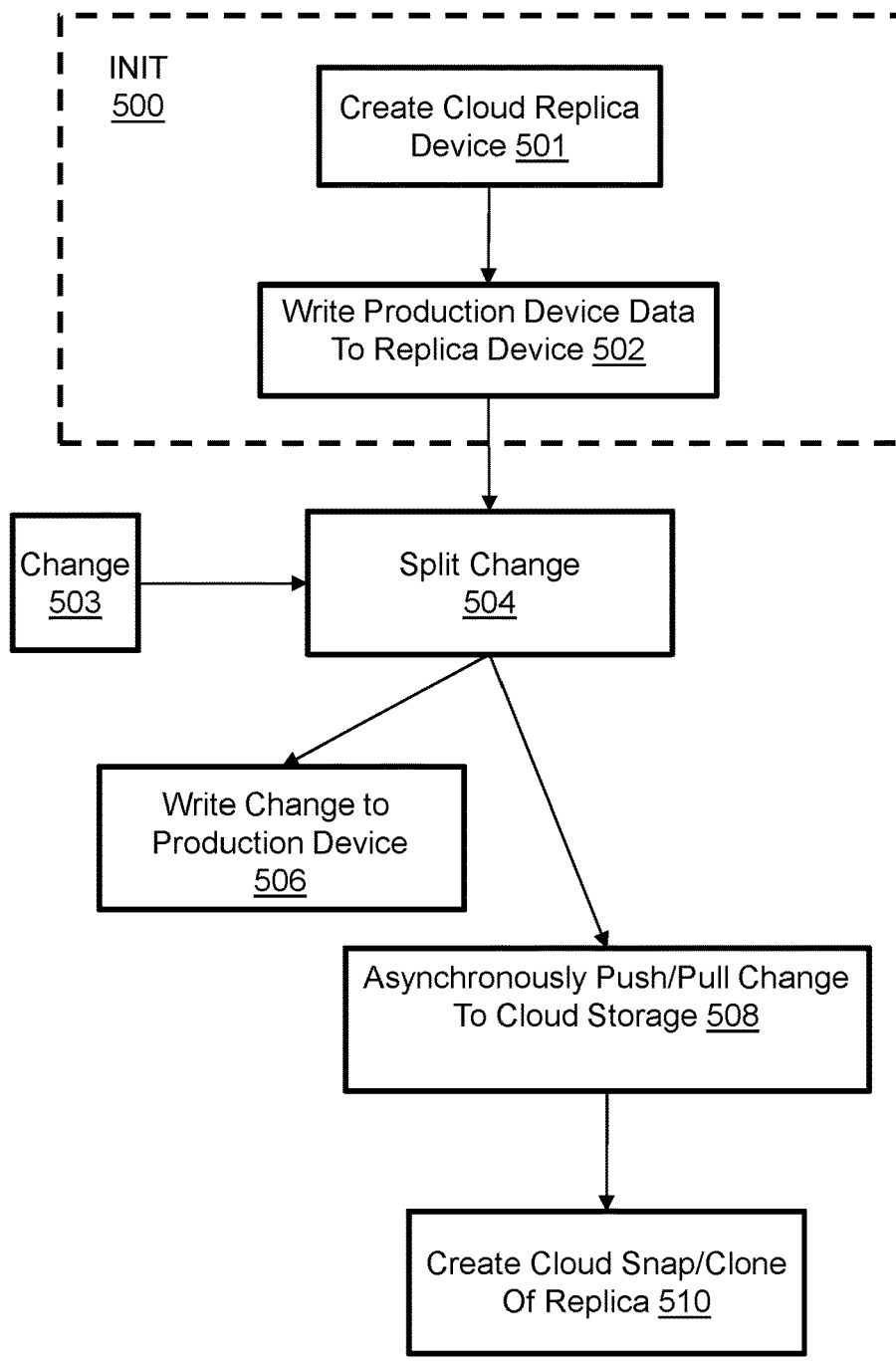
FIG. 5 illustrates a method of generating a cloud storage replica.

FIG. 5 illustrates a method of generating a cloud storage replica. An initialization procedure 500 includes creating a cloud replica device as indicated in block 501. This may include creation of a logical storage device corresponding to the production device (104, FIG. 2) being replicated. The data on the production device is then written to the replica device as indicated in block 502. Having initialized the cloud storage replica, the production device and cloud storage replica are asynchronously updated in response to a change 503. For example and without limitation, change 503 may be an IO write request. The change is split as indicated in block 504. For example and without limitation, the IO write request may be copied. The change is written to the production device as indicated in block 506. The change is asynchronously pushed or pulled to cloud storage as indicated in block 508. Typically, the change will be implemented at cloud storage after having been implemented at the storage array. Updating the replica may include creation of snaps and clones as indicated in block 510.

Figure 6:
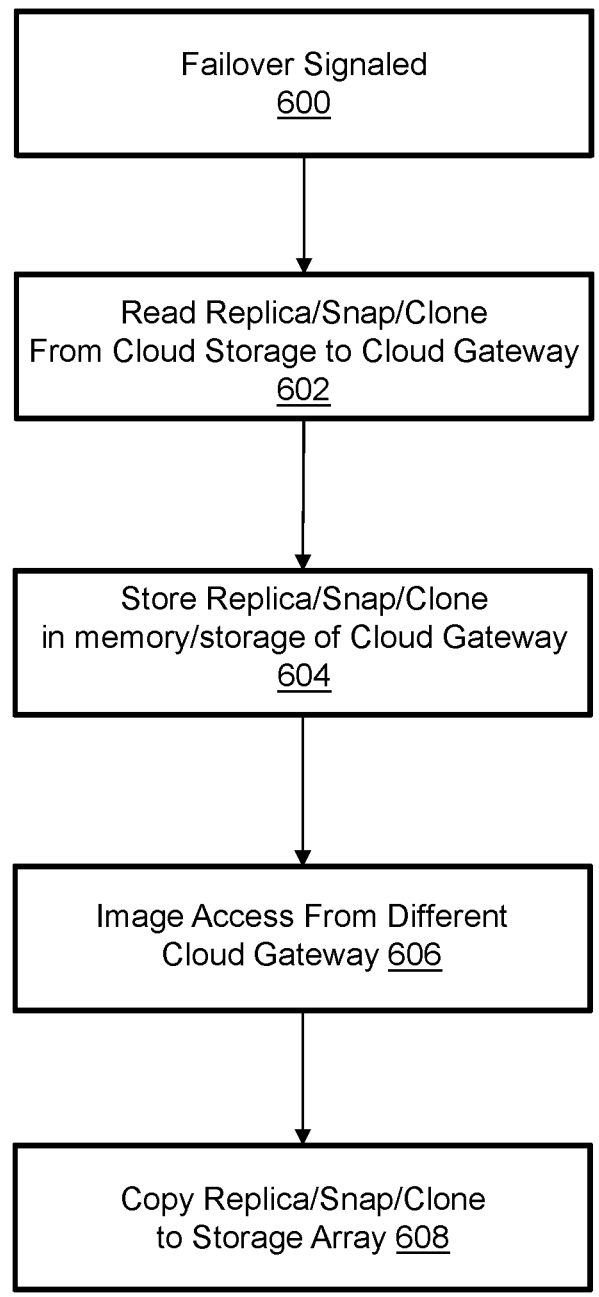
FIG. 6 illustrates a method of using a cloud storage replica for failover.

FIG. 6 illustrates a method of using a cloud storage replica for failover. A failover is signaled, e.g. and without limitation by the primary data replication appliance, as indicated in block 600. In response, the replica or a snap or clone thereof is read from cloud storage to the cloud storage gateway as indicated at block 602. For example and without limitation, a required portion of the data may be read to the cloud gateway rather than the entire replica. The replica snap or clone is stored in the cloud gateway as indicated in block 604. For example and without limitation, the most active data may be stored in memory and less active data may be stored in lower performance persistent storage, if the cloud gateway is equipped with such storage.

If image access is desired then a different storage array can connect to the replica, snaps and clones in cloud storage via another cloud storage gateway (124 FIG. 1) as indicated in block 606. The data from the appropriate copy will be read from cloud storage and cached in that cloud gateway (124 FIG. 1). Both cloud gateways (114, 124, FIG. 1) can expose the replica, snap and clone data storage arrays and hosts. If the production site is destroyed then a new site can be established by copying the replica, snap and clone data to a replacement or repaired storage array as indicated in block 608.

A number of features, aspects, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
    a first storage array comprising:
        a plurality of interconnected computing nodes, each of the computing nodes comprising at least one processor and non-transitory memory;
        a plurality of groups of data storage drives, each group of data storage drives connected with one of the computing nodes; and
        a production device comprising contiguous logical block addresses that map to non-contiguous addresses of the data storage drives;
    a cloud storage comprising a plurality of storage servers, each storage server associated with at least one data storage drive, wherein performance capability of the storage array differs from performance capability of the cloud storage, and a cloud replica of the production device is maintained on one or more of the data storage drives associated with the storage servers by asynchronously implementing production device changes on the cloud replica;
    a cloud gateway with a processor, memory and instructions on non-transitory computer-readable memory that convert IOs between a first form used by the first storage array and a second form used by the cloud storage, the cloud gateway reading at least a part of the cloud replica in response to a failover situation; and
    a second storage array comprising:
        a plurality of interconnected computing nodes, each of the computing nodes comprising at least one processor and non-transitory memory; and
        a plurality of groups of data storage drives, each group of data storage drives connected with one of the computing nodes, wherein the computing nodes of the second storage array create a second production device from the cloud replica in response to the failover situation.

2. The apparatus of claim 1 comprising a splitter in the first storage array that provides the cloud gateway with copies of IOs that cause changes to the production device, and wherein the cloud gateway converts the copies of the IOs to the second form and provides converted IOs to the cloud storage.

3. The apparatus of claim 2 wherein the cloud storage uses the converted IOs to generate a snap.

4. The apparatus of claim 2 wherein the cloud storage uses the converted IOs to generate a clone.

5. The apparatus of claim 2 wherein the cloud storage uses the converted IOs to update the replica.

6. The apparatus of claim 1 wherein the cloud gateway reads a snap of the replica in the failover situation.

7. The apparatus of claim 1 wherein a second cloud gateway accesses an image of the cloud replica in the failover situation.

8. A method comprising:
creating a cloud replica of a production device that is maintained by a first storage array, the cloud replica existing in cloud storage, wherein performance capability of the first storage array differs from performance capability of the cloud storage;
writing production device data to the cloud replica;
asynchronously implementing production device changes on the cloud replica; and
in response to a failover situation:
reading at least a part of the cloud replica to a cloud gateway; and
creating a second production device on a second storage array from the cloud replica.

9. The method of claim 8 comprising splitting the changes by creating copies of IOs.

10. The method of claim 8 comprising using the changes to generate a snap in the cloud storage.

11. The method of claim 8 comprising using the changes to generate a clone in the cloud storage.

12. The method of claim 8 comprising reading at least a part of the cloud replica to a cloud gateway in the failover situation.

13. The method of claim 12 comprising a second cloud gateway accessing an image of the cloud replica in the failover situation.

14. The method of claim 8 comprising reading a snap of the cloud replica to a cloud gateway in the failover situation.

15. The method of claim 8 comprising reading a clone of the cloud replica to a cloud gateway in the failover situation.

16. An apparatus comprising:
a data replication appliance comprising a processor, non-transitory memory and instructions stored thereon that:
create a cloud replica of a production device that is maintained by a storage array, the cloud replica existing in cloud storage, wherein performance capability of the storage array differs from performance capability of the cloud storage;
write production device data to the cloud replica;
asynchronously implement production device changes on the cloud replica; and
in response to a failover situation:
prompt at least a part of the cloud replica to be read by a cloud gateway; and
prompt creation of a second production device on a second storage array from the cloud replica.

\* \* \* \* \*